(12) United States Patent
Brunschwiler et al.

(10) Patent No.: US 10,538,390 B2
(45) Date of Patent: Jan. 21, 2020

(54) CONVEYING DEVICE (71) Applicant: FERAG AG, Hinwil (CH)

(72) Inventors: Othmar Brunschwiler, Bettwiesen (CH); Simon Beutler, Tann (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 16/228,075

(22) Filed: Dec. 20, 2018

(65) Prior Publication Data

US 2019/0193944 A1 Jun. 27, 2019

(30) Foreign Application Priority Data

Dec. 21, 2017 (CH) ..................................... 01595/17

(51) Int. Cl.
*B65G 19/02* (2006.01)
*B65G 9/00* (2006.01)
*B65G 35/06* (2006.01)

(52) U.S. Cl.
CPC ........... *B65G 19/025* (2013.01); *B65G 9/008* (2013.01); *B65G 35/06* (2013.01); *B65G 2207/32* (2013.01); *B65G 2812/188* (2013.01)

(58) Field of Classification Search
CPC ...... B65G 9/002; B65G 9/008; B65G 17/005; B65G 17/20; B65G 19/025; B65G 23/16; B65G 35/06; B65G 47/61; B65G 2207/32; B65G 2812/188; B65G 17/38; B65G 23/14; B61B 10/025
See application file for complete search history.

(56) References Cited

U.S. PATENT DOCUMENTS

| 3,196,804 | A | * | 7/1965 | Harrison | ............... | B61B 10/025 |
|---|---|---|---|---|---|---|
| | | | | | | 104/172.4 |
| 3,343,498 | A | * | 9/1967 | Klamp | .................. | B61B 10/025 |
| | | | | | | 104/88.05 |
| 5,007,525 | A | | 4/1991 | Crawshay | | |
| 6,357,574 | B1 | * | 3/2002 | Eberle | .................. | B65H 29/003 |
| | | | | | | 198/465.4 |
| 9,205,992 | B2 | * | 12/2015 | Otto | ........................ | B65G 17/20 |
| 9,499,345 | B2 | * | 11/2016 | Fenile | .................. | B65G 19/025 |

(Continued)

FOREIGN PATENT DOCUMENTS

| CH | 709 392 A1 | 9/2015 |
|---|---|---|
| DE | 1 171 335 B | 5/1964 |

(Continued)

*Primary Examiner* — Gene O Crawford
*Assistant Examiner* — Keith R Campbell
(74) *Attorney, Agent, or Firm* — Pauley Erickson & Kottis (57) ABSTRACT

A conveyor device (100) includes a conveyor track (11, 12, 13) and a plurality of transport units conveyable along the conveyor track (11, 12, 13), at least two first guide rollers (2.1-2.7) and a conveyor chain (3), which travels over the at least two first guide rollers (2.1-2.7) and comprises catches (31), via which the conveyor chain (3) can be brought into releasable engagement with the transport units (8) for driving the transport units (8), the conveyor device (100) further including a belt (4) moving along with the conveyor chain (3) over the at least two guide rollers (2.1-2.7), wherein the belt (4), in the respective area of the first guide rollers (2.1-2.7), is arranged, respectively, between the first guide roller (2.1-2.7) and the conveyor chain (3) such that the conveyor chain (3) lies against the belt (4).

19 Claims, 6 Drawing Sheets (56) References Cited

U.S. PATENT DOCUMENTS

| | | | | |
|---|---|---|---|---|
| 9,931,722 B2 * | 4/2018 | Guhl | ................ | B61B 10/00 |
| 10,011,425 B2 * | 7/2018 | Otto | ................ | B65G 9/006 |
| 10,023,386 B2 * | 7/2018 | Otto | ................ | B65G 9/008 |

FOREIGN PATENT DOCUMENTS

| | | |
|---|---|---|
| DE | 1 937 606 A1 | 2/1971 |
| DE | 31 01 355 A1 | 9/1982 |
| WO | WO 99/33731 A1 | 7/1999 |

\* cited by examiner

CONVEYING DEVICE

CROSS-REFERENCE TO RELATED APPLICATIONS

Swiss Patent Applications 01595/17, filed 21 Dec. 2017, the priority document corresponding to this invention, to which a foreign priority benefit is claimed under Title 35, United States Code, Section 119, and their entire teachings are incorporated, by reference, into this specification.

BACKGROUND OF THE INVENTION

Field of the Invention

The present invention relates to a conveyor device with a plurality of transport units which can be conveyed on a conveying track, and a conveyor chain which can be brought into releasable engagement with the transport units for driving the transport units.

Discussion of Related Art

In conveyor systems with chain drives noise emission represents a known problem. Noise is predominantly generated by the knocking and/or dragging of chain links on chain wheels, wherein apart from deflecting movements vibrations of the chain also cause undesirable knocking noises. Due to the metal parts involved colliding with each other, noise levels can become unacceptable, in particular at high conveying speeds. However chains made of metal are still preferred because of their high resistance against wear and their high load-bearing capacity.

Various solutions have therefore been proposed in the art in order to reduce noise levels in conveyor systems with chain drives.

The DE 3101355 C2 describes a roller conveyor consisting of idle rollers rotatably mounted sequentially in a roller conveyor frame and driven, at least partially, by a chain drive, wherein the chain drive consists of sprocket wheels arranged on the idle roller axles of the idle rollers and a drive chain engaging therewith, the drive chain extending within one of the longitudinal beams of the roller conveyor frame, wherein the tensioned span of the drive chain extends within a closed chamber attached to a longitudinal beam. The chamber consists of a sound-absorbing plastic hollow profile, in which the drive chain with its tensioned span is guided. The chamber is limited on all sides by sound-absorbing plastic walls, wherein furthermore guidance of the chain in the hollow profile is ensured. Thus grinding noises on the side walls and knocking noises are prevented in upward direction.

BRIEF SUMMARY OF THE INVENTION

With the automatic conveyance of transport goods such as commodities or printed products, overhead conveyors with transport units movable in a conveyor track such as trolleys conveyable along a guide rail, have, in particular, proven themselves, due to, among other things, the spatial adaptability of the conveyor tracks and their suitability for buffers or temporary storage. In certain conveyor tracks high conveying speeds are desirable in order to increase conveying capacity. Furthermore, switching systems are used for sorting or temporarily storing the transport goods, which may involve a plurality of track switches. If the transport units are driven by means of a conveyor chain, it is desirable to reduce the noise level generated by the conveyor chain.

It is therefore an object of the invention to propose a conveyor device, which improves, at least in part, the state of the art as regards the noise level generated by a conveyor chain.

This object is achieved by the features of the independent claim. Advantageous embodiments of the invention are disclosed in the dependent claims and in the present description and the figures.

The invention relates to a conveyor device comprising a conveyor track and a plurality of transport units conveyable in the conveyor track, at least two first guide rollers and a conveyor chain, which travels over the at least two first guide rollers and comprises catches, via which the conveyor chain can be brought into releasable engagement with the transport units. The conveyor device further comprises a belt moving together with the conveyor chain over the at least two first guide rollers, wherein the belt, in the respective area of the first guide rollers, is arranged between the first guide roller and the conveyor chain such that the conveyor chain lies against the belt.

Due to the belt lying against the conveyor chain a reduction in noise is achieved, among other things, in that direct contact between the conveyor chain and the guide roller is wholly or at least partially avoided while the conveyor chain travels over the guide roller. Moreover it is possible to prevent the conveyor chain from knocking against the guide roller or to dampen these knocks. Having the belt moving along with the conveyor chain offers the advantage that the belt and the conveyor chain do not perform any or very few undesirable relative movements towards each other, so that, among other things, any wear and/or knocking movements between belt and conveyor chain can be minimized. Preferably the conveyor chain lies against the belt also in the area between the guide rollers, which among others, offers the advantage that undesirable vibrations of the conveyor chain can be reduced or, more specifically, dampened.

The belt according to the present invention therefore offers a low-cost and efficient solution for a reduction in noise generated by a conveyor chain in a conveyor device. Independently of the number of involved guide rollers a reduction in noise can be achieved with a belt for several or all guide rollers, without it being mandatory to provide separating damping elements for each guide roller. Due to the low level of cost it is also possible, in case the conveyor track is altered, to fit an existing belt with a new length-adjusted belt into the conveyor device, in a simple manner.

In terms of the invention it is also feasible to provide two or more parallel belts and corresponding conveyor chains. It is also feasible to provide a wide belt, which can be contacted by several parallel conveyor chains. The number of belts and/or conveyor chains can, for example, be adapted to the tensile load according to requirements.

In an embodiment the belt is configured such that the conveyor chain travels over the first guide rollers at a distance from the first guide rollers, respectively.

Due to the fact that the conveyor chain travels over the first guide rollers as a distance from the same, direct contact between conveyor chain and first guide rollers is completely avoided, which advantageously leads to an optimized reduction in noise. Preferably the belt is of sufficient height with regard to the distance between the conveyor chain and the first guide rollers.

In an embodiment the conveyor chain is configured to run at a conveyor speed over the at least two first guide rollers and the belt is configured to run along with the conveyor chain at a conveyor speed which is less than or identical to the conveyor speed of the conveyor chain.

In particular slippage may occur between belt and conveyor chain, which has the advantage that a change in the conveyor speed or in the conveyor track can be absorbed without for example undesirable vibrations occurring.

In an embodiment the length of the belt is shorter or longer than the length of the conveyor chain. Because of the difference between the conveyor speed of the conveyor chain and the speed of the belt, differences in length between belt and conveyor chain can be absorbed. For example, the conveyor chain and the belt may run over additional guide rollers or sprocket wheels, at least section-wise, along different tracks. The conveyor chain and the belt offer the advantage that variable designs are possible for the tracks and the speeds for the conveyor chain and/or the belt. Usually the conveyor chain and belt are designed to circulate, making a variable implementation particularly advantageous.

In an embodiment the conveyor chain has chain links which are in contact with the belt in a friction-type manner.

As a result of the friction-type contact of the chain links of the conveyor chain with the belt, the belt is taken along due to the conveying movement of the conveyor chain and travels along with conveyor chain. The conveyor chain is therefore preferably, at least partially, in friction-type contact with the belt and does not have to be in friction-type contact with the belt over the entire length of the conveyor chain. Preferably conveyor chain and belt are arranged in such a way that the chain links of the conveyor chain are in friction-type contact with the belt in the area of the first guide rollers; Due to the friction-type connection between conveyor chain and belt tension in the chain can be translated via the belt into a torque of the first guide rollers.

In an embodiment the conveyor chain is realized as a roller chain and contacts the belt with its rollers.

Usually the conveyor chain has chain links comprising rollers and lugs. Preferably the chain links, in the area of the first guide rollers, are in friction-type contact with the belt via the rollers.

In an embodiment the belt is dimensioned such that the conveyor chain, in the area of the first guide rollers, is in contact with the belt and extending beyond the belt transversely to the conveying direction.

The conveyor chain can extend beyond the belt on both sides or on one side, transversely to the conveying direction.

Preferably the belt is configured such that the support surface of the conveyor chain in the area of the first guide rollers is smaller than the width of the conveyor chain.

In an embodiment the width of the belt is less than the width of the conveyor chain.

With a roller chain the conveyor chain, in the area of the first guide rollers, is preferably in contact with the belt via the rollers such that the conveyor chain, with the lugs of the chain links, extends beyond the belt transversely to the conveying direction. Preferably the belt is if sufficient height so that the lugs do not come into contact with the first guide roller.

In an embodiment the first guide rollers comprise at least one groove, in which the belt can be, at least partially, received.

Preferably the belt can be positively received in the groove, which ensures more stability and permits safe guidance of the belt about the first guide rollers even at high conveying speeds.

In an embodiment, the first guide rollers comprise a groove, which is stepped in cross-section, and this comprises an outer groove for receiving the conveyor chain and an inner groove formed in the outer groove, for receiving the belt.

In one design, the belt is made, at least partially, of an elastomer.

By selecting a suitable elastomer the friction-type connection between conveyor chain and belt can be optimized.

In an embodiment, the belt has one of the following cross-section profiles: trapezoidal-shaped, trapezoidal-shaped with at least one curved side, circular-shaped, oval, dumbbell-shaped, rectangular, square with at least one curved side.

In particular at least one side of the belt may be concave or convex.

For a belt with a concave side the concave side may form a recess in which the conveyor chain can be received.

Preferably the belt is realized as a round belt, flat belt, V-belt, or ribbed belt.

In an embodiment, the belt has recesses, preferably at regular intervals. The recesses are of advantage in particular, if the conveyor chain is driven by means of a sprocket wheel with teeth, since the belt arranged between sprocket wheel and conveyor chain can then also move over the sprocket wheel, wherein the teeth can engage in the recesses.

In an embodiment, the belt comprises a shell and a core, which are made of different materials.

By selecting suitable materials for the shell and the core the load-bearing capacity of the belt can be increased. The shell for example, may be made, at least partially, of an elastomer and the core made be made, at least partially, of a plastic.

In an embodiment, the conveyor device may comprise at least one second guide roller, over which the conveyor chain moves and which is arranged so as to move in the opposite direction to the first guide rollers.

Using the first and second guide rollers the conveyor chain can be redirected, as required, in various directions, and the conveying direction can be flexibly adapted to suit the use in a conveyor system. Due to the noise reduction achieved the conveyor device can be equipped with a plurality of guide rollers, without this leading to an annoying increase in noise levels.

In an embodiment, the conveyor device comprises an outer belt moving along with the conveyor chain over the at least one second guide roller, which outer belt is arranged in the respective area of the at least one second guide roller between the second guide roller and the conveyor chain such that the outer belt is in contact with the conveyor chain.

The outer belt offers the advantage of being able to achieve a reduction in noise, as with the first guide rollers, also for the at least one second guide roller. The outer belt can, in addition, provide improved damping of vibrations of the conveyor chain. Preferably the conveyor chain has chain links, which are in friction-type contact with the outer belt in the area of the second guide roller.

In an embodiment, the at least one second guide roller comprises a damping element, preferably in the form of a ring, which damping element is received in a groove of the sprocket wheel such that the conveyor chain when moving over the second guide roller, contacts the damping element, at least partially.

In an embodiment, the conveyor device comprises a sprocket wheel for driving the conveyor chain.

Preferably the belt is guided past the sprocket wheel without contacting it.

In particular this can be achieved by having different lengths as well as different speeds for the belt and the conveyor chain. Usually the sprocket wheel comprises teeth, which on contact with the belt can lead to wear. Due to guiding the belt in a contactless manner past the sprocket wheel, wear to the belt from the teeth of the sprocket wheel can be avoided. It is also feasible that the sprocket wheel is designed without teeth.

In an embodiment, the sprocket wheel is arranged between conveyor chain and belt.

Alternatively the belt can move over the sprocket wheel together with the conveyor chain, wherein the belt, in the area of the sprocket wheel, is preferably arranged between the sprocket wheel and the conveyor chain such that the conveyor chain is in contact with the belt. Advantageously, the belt therefore can ensure a reduction in noise also for the movement of the conveyor chain over the sprocket wheel.

With a sprocket wheel with teeth the belt may comprise recesses at regular intervals, in which the teeth can engage while the belt moves over the sprocket wheel. Alternatively two belts may each be guided laterally past the teeth.

In an embodiment, the sprocket wheel comprises a damping element, preferably an O-ring, which is received in a groove of the sprocket wheel such that the conveyor chain when moving over the sprocket wheel, is at least partially in contact with the damping element.

The damping element has the advantage that the direct contact surface between conveyor chain and sprocket wheel is reduced as the conveyor chain moves over the sprocket wheel, thereby achieving a reduction in noise. Advantageously the conveyor chain, as it moves over the sprocket wheel, makes contact first or exclusively with the damping element, so that knocks can be dampened. The damping element may be made at least partially of an elastomer or a plastic.

Preferably the conveyor chain is configured as a roller chain and the sprocket wheel comprises two damping elements, preferably O-rings, which are each received in a groove of the sprocket wheel such that the conveyor chain is in contact via lugs with the damping element. The sprocket wheel preferably comprises teeth which are arranged between the damping elements.

In an embodiment, the conveyor device comprises at least one track switch, wherein the conveyor chain can be brought into engagement with transport units in a branching-off conveyor track of the track switch.

The conveyor device with the belt is particularly advantageous for track switches because the conveyor chain, with track switches, usually has to perform several diversions, which leads to increased noise pollution. Using the belt according to the invention the noises generated in conjunction with track switches and additional diversions of the conveyor chain can be reduced.

In an embodiment the conveyor device is configured as an ascending conveyor or a descending conveyor.

The conveyor device can be used as a conveyor in many different ways within a conveyor system. The conveyor device is of advantage in particular for conveyors, in which guide rollers or sprocket wheels are used, making noise reduction particularly desirable.

In an embodiment the at least two first guide rollers and/or the at least one second guide roller are/is at least partially, made of plastic.

Preferably the at least two first guide rollers and/or the at least one second guide roller are formed without teeth.

In one advantageous design the conveyor device is configured as an overhead conveyor.

Preferably the conveyor track is configured as a guide rail and the transport units are configured as trolleys conveyable on the guide rail.

The conveyor track may be configured in many ways, for example as a channel, a roller carpet, a guide rail, conveyor belt, module belt or the like.

The transport units may be configured as bowls, trays, baskets, tool carriers, trolleys, compositions, in particular finitely linked or interconnected transport units, containers or the like.

BRIEF DESCRIPTION OF SEVERAL VIEWS OF THE DRAWINGS

Embodiments of the invention will now be explained in detail by way of the figures and associated description, as follows:

FIG. 3c shows a side view of the second guide roller as per FIG. 3a;

FIG. 6c shows a side view of the sprocket wheel as per FIG. 6a;

DETAILED DESCRIPTION OF THE INVENTION

The invention will now be explained in detail by describing preferred embodiments with reference to the figures.

Figure 1:
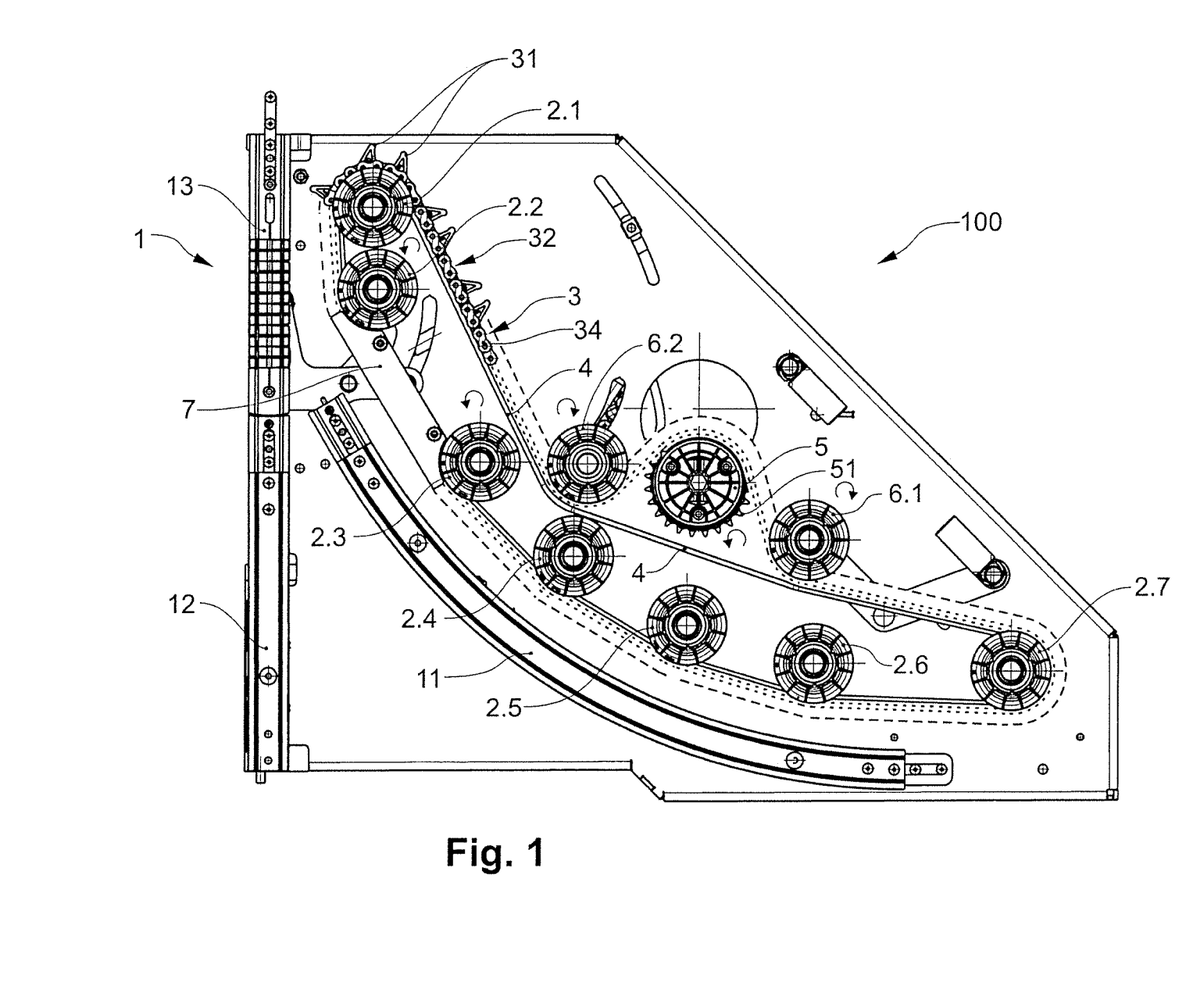
FIG. 1 shows an embodiment of an overhead conveyor device from below.

FIG. 1 shows an embodiment of an overhead conveyor device 100 in a view from below, the overhead conveyor device 100 comprising guide rails 11, 12, 13 which form a track switch 1, seven first guide rollers 2.1-2.7 and a conveyor chain 3, which travels over the first guide rollers 2.1-2.7. The conveyor chain 3 is configured as a roller chain and comprises catches 31, which are arranged on chain links of the conveyor chain 3. The conveyor chain 3 can be brought via the catches 31 into releasable engagement with the trolleys (not shown in FIG. 1) which can be conveyed in the guide rails 11, 12, 13. The overhead conveyor device 100 further comprises a belt 4 moving along with the conveyor chain 3 over the first guide rollers 2.1-2.7. The belt 4 is arranged in the respective area of the first guide rollers 2.1-2.7, respectively between the first guide rollers 2.1-2.7 such that the conveyor chain 3 lies against the belt 4. The belt 4 is made of an elastomer.

The overhead conveyor device 100 further comprises two second guide rollers 6.1, 6.2, over which the conveyor chain 3 travels. The conveyor chain 3 and the belt 4 are configured to circulate, wherein the first guide rollers 2.1-2.7 are arranged inside the circulating conveyor chain 3/the circulating belt 4 and the second guide rollers 6.1, 6.2 are arranged outside the circulating conveyor chain 3/the circulating belt 4. As indicated by the curved arrows, the second guide rollers 6.1, 6.2 are therefore arranged to rotate in the opposite direction.

As revealed in FIG. 1, the conveyor chain 3 is in contact with the belt 4 except in the area between the two second guide rollers 6.1, 6.2. In the area between the two second guide rollers 6.1, 6.2 a sprocket wheel 5 is arranged, which is in engagement with the conveyor chain 3 via the teeth 51 and which drives the conveyor chain. The sprocket wheel 5 in turn is arranged between the conveyor chain 3 and the belt 4, wherein the belt 4 is guided past the sprocket wheel 5 without touching it. Due to the arrangement with the two second guide rollers 6.1, 6.2 the conveyor chain 3 is arranged to be guided through an additional loop, in which the sprocket wheel 5 is arranged to drive the conveyor chain 3. For reasons of better clarity in FIG. 1 the conveyor chain 3 and the catches 31 have not been drawn throughout the extent of the circulating track but only indicated by means of dotted lines. The dotted lines which indicate the conveyor chain 3 and the catches 31, are interrupted in the area between the guide rollers 2.2 and 2.3 by a cover 7, which covers the conveyor chain 3 and the catches 31.

Figure 2:
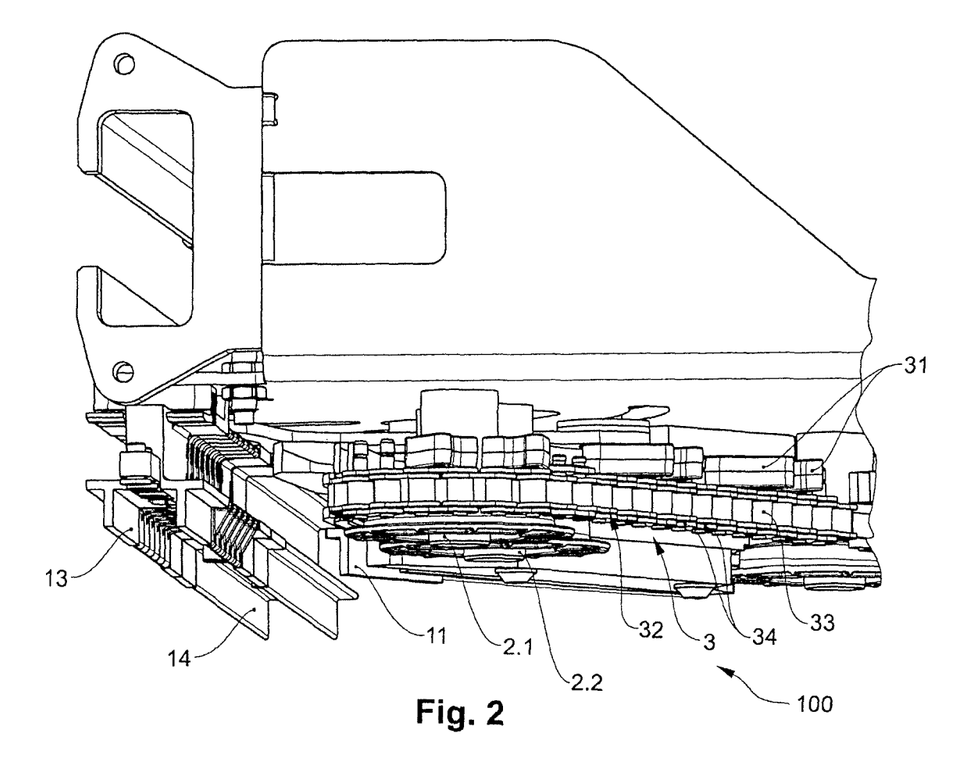
FIG. 2 shows the overhead conveyor device of FIG. 1 in a perspective view from below.

FIG. 2 shows a perspective view of the overhead conveyor device 100 as per FIG. 1 from below. FIG. 2 reveals that the conveyor chain 3 is configured as a roller chain with chain links 32 and rollers 33 as well as lugs 34. The conveyor chain 3 (or the chain links 32) is in contact via the rollers 33 with the belt (hidden by the conveyor chain 3 in FIG. 2), wherein the chain links 32 of the conveyor chain 3 are in friction-type contact with the belt via the rollers 33, in particular in the area of the first guide rollers 2.1-2.7.

Figure 3A:
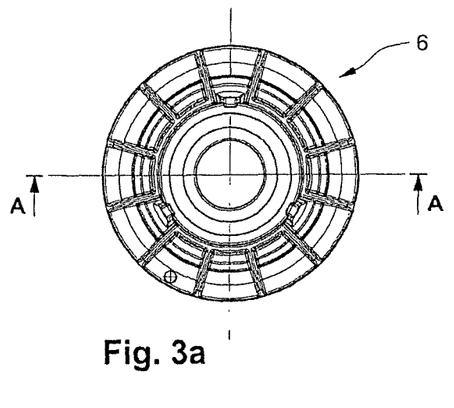
FIG. 3a shows a view of a second guide roller as per FIG. 1 from below.

FIG. 3a shows a view of a second guide roller 6 as per FIG. 1 from below. The guide roller 6 is made of plastic by means of injection moulding and is made without teeth.

Figure 3B:
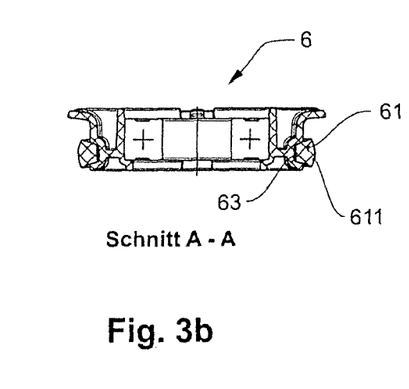
FIG. 3b shows a side view of the second guide roller as per FIG. 3a along line A-A.

FIG. 3b shows a cut view of the second guide roller 6 from FIG. 3a along cut line A-A. The guide roller 6 comprises a groove 63, in which a damping element 61 is received. The damping element 61 comprises a trapezoidal-shaped cross-section profile with an arched side 611, which forms a support surface for the conveyor chain.

Figure 3C:
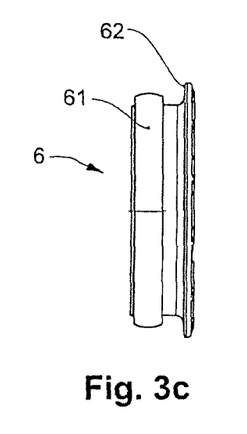

FIG. 3c shows a side view of the second guide roller 6 from FIG. 3a, which is shaped in the form of a ring. The conveyor chain while travelling over the second guide roller 6, is in contact with the damping element 61, wherein the damping element 61 is of sufficient height to ensure that the conveyor chain is not touching the second guide roller 6 when travelling over the same. The second guide roller 6 comprises a flange 62 in order to prevent the conveyor chain from falling off.

The figures reveal that a sectional view or side view of a first guide roller with the belt, from that side on which the belt is resting on the first guide roller, i.e. where the conveyor chain and the belt are diverted by the guide roller, would look analogous to FIG. 3b. Correspondingly FIGS. 3a-3c may be regarded as depictions of the first guide roller.

Figure 4A:
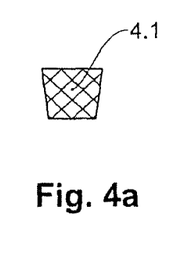
FIG. 4a shows a cross-sectional view of one embodiment of a belt.

FIG. 4a shows a cut view of an embodiment of a belt 4.1. The belt 4.1 comprises a trapezoidal-shaped cross-section profile, forming a V-belt.

Figure 4B:
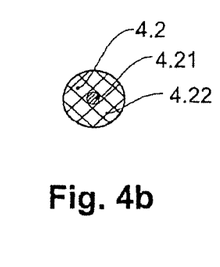
FIG. 4b shows a cross-sectional view of one embodiment of a belt.

FIG. 4b shows a cut view of a further embodiment of a belt 4.2 with a circular-shaped cross-section profile, forming a round belt. The belt 4.2 comprises a core 4.21 made of a plastic and a shell 4.2.2 made of an elastomer.

Figure 4C:
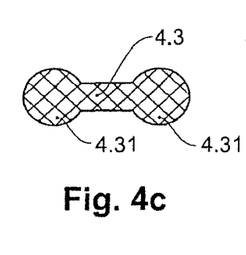
FIG. 4c shows a cross-sectional view of one embodiment of a belt.

A further embodiment of a belt 4.3 is shown in FIG. 4c. The belt 4.3 comprises a dumbbell-shaped cross-section profile with circular-shaped sides 4.31. The circular-shaped sides 4.31 may form a distributed support surface for a wide conveyor chain or two support surfaces for two conveyor chains extending in parallel. The circular-shaped sides 4.31 may be received in two suitable grooves of a guide roller.

Figure 4D:
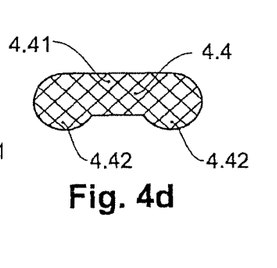
FIG. 4d shows a cross-sectional view of one embodiment of a belt.

A variant of a belt 4.4 with a dumbbell-shaped cross-section profile is shown in FIG. 4d. The sides 4.42 of the belt 4.4 deviate from the shape of the sides of the belt 4.3 in FIG. 4c insofar as the belt 4.4 comprises a flat support surface 4.41. Due to this shape, the lower areas of sides 4.42 of the belt 4.4 are held in suitable grooves in a guide roller, and the belt, because of the flat upper side, can form a wide support surface for a conveyor chain.

Figure 4E:
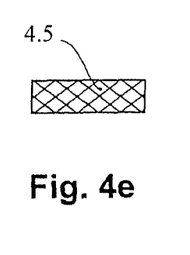
FIG. 4e shows a cross-sectional view of one embodiment of a belt.

FIG. 4e shows a further embodiment of a belt 4.5, which is shaped as flat belt with a square cross-section profile.

Figure 5:
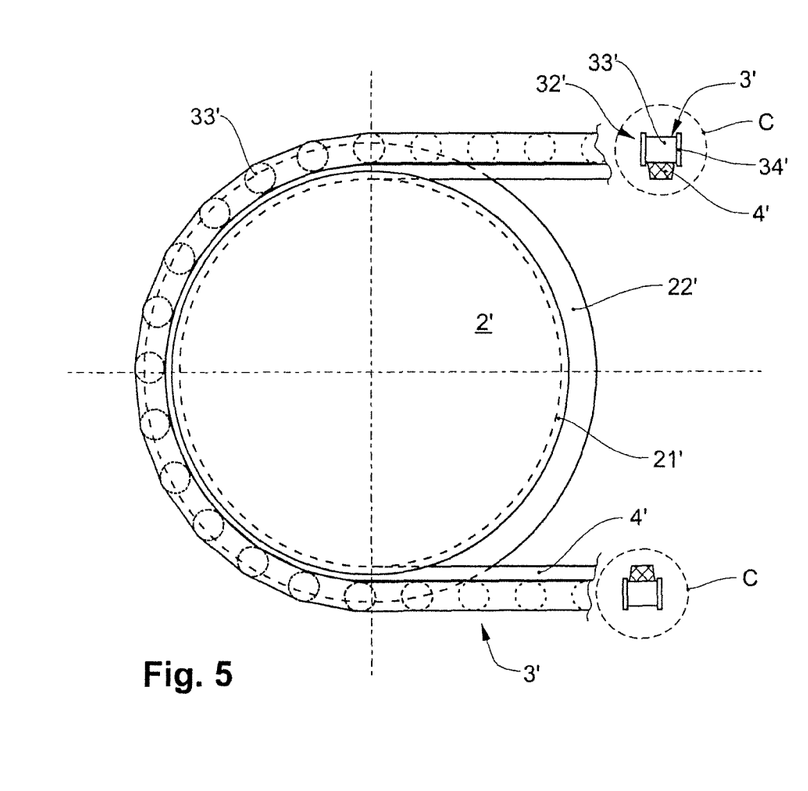
FIG. 5 shows a top view of a first guide roller with a conveyor chain and a belt as well as side views of a conveyor chain with a cut depiction of a belt.

FIG. 5 shows a top view of a first guide roller 2' with a conveyor chain 3' and a belt 4' as well as side views C of a conveyor chain 3' with a cut depiction of a belt 4'. The belt 4' has a trapezoidal-shaped cross-section profile. The conveyor chain 3' is configured as a roller chain with chain links 32' and rollers 33'. The chain links 33', in the area of the first guide roller 2', are in friction-type contact with the belt 4' via the rollers 33'. The width of the belt 4' is less than the width of the conveyor chain 3', so that the conveyor chain 3' with lugs 34' of the chain links 32' extends beyond the belt 4' transversely to the conveying direction. The belt 4' is received in a groove 21' of the first guide roller 2' and comprises sufficient height, so that the conveyor chain 3' travels over the first guide roller 2' at a distance therefrom. Direct contact between the conveyor chain 3' and the first guide roller 2' is therefore completely avoided. Hidden components such as the groove 21' of the first guide roller 2' or the rollers 33' are indicated as broken lines. The guide roller 2' comprises a flange 22' in order to prevent the conveyor chain 3' from falling off.

It will be clear to the expert that the features of the belt described in FIGS. 1, 2, in particular FIGS. 4a-4e and 5 can be applied correspondingly to embodiments with second guide rollers and external belts not shown in the figures.

Figure 6A:
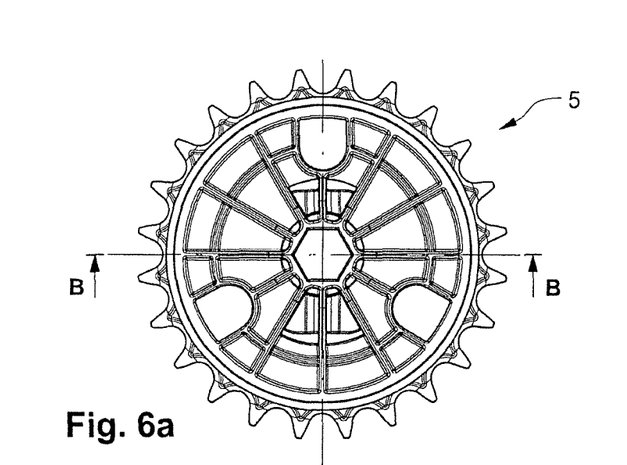
FIG. 6a shows a top view of a sprocket wheel as per FIG. 1.

FIG. 6a shows a top view of a sprocket wheel 5 as per FIG. 1 with teeth 5.1, which for driving can be brought into engagement with the conveyor chain. The sprocket wheel 5 is, in the main, made of metal or plastic.

Figure 6B:
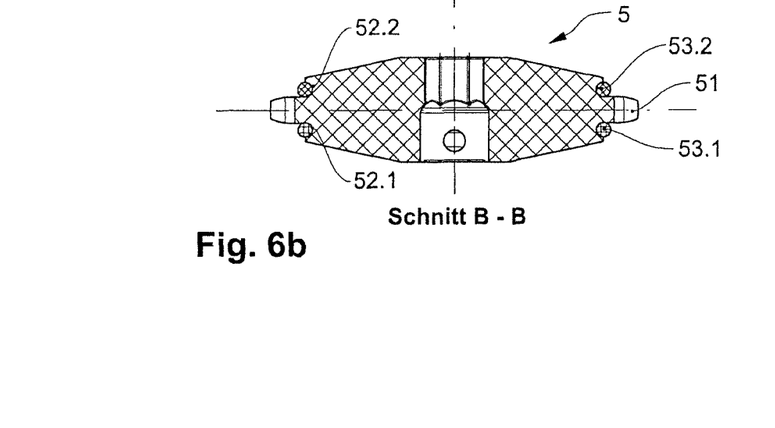
FIG. 6b show a cut view of a sprocket wheel as per FIG. 6a along line B-B.

FIG. 6b shows a cut view of the sprocket wheel 5 in FIG. 6a along cut line B-B. The sprocket wheel 5 comprises two circumferential grooves 52.1, 52.2, in which an O-ring 53.1, 53.2 each is received. The teeth 51 of the sprocket wheel 5 are arranged between the O-rings 53.1, 53.2. The conveyor chain as per FIG. 1, when travelling over the sprocket wheel 5, is in contact with the O-rings 53.1, 53.2 via the lugs of the chain links.

Figure 6C:
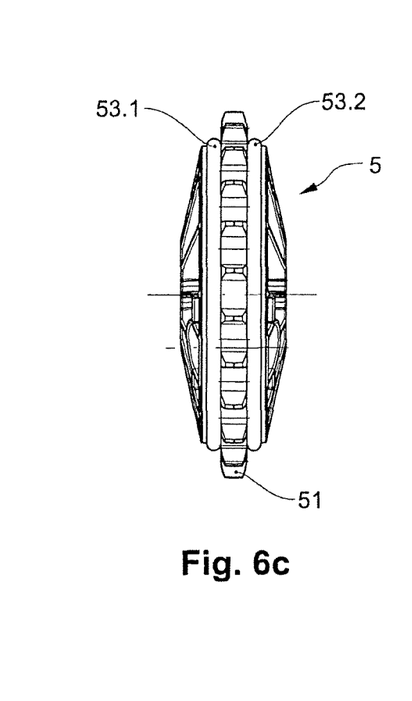

The arrangement of the O-rings 53.1, 53.2 is also shown in the side view of the sprocket wheel 5 in FIG. 6c with the teeth 51 between the O-rings 53.1, 53.2.

Using the overhead conveyor device comprising a belt and damping elements it is possible to achieve a noise reduction by approx. 73 dBA down to approx. 52 dBA.

Figure 7:
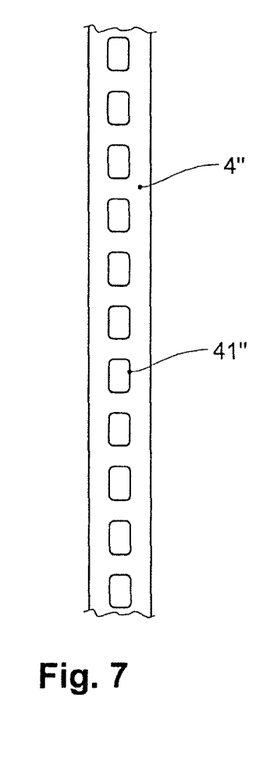
FIG. 7 shows a top view of an embodiment of a belt with recesses.

FIG. 7 shows a top view of an embodiment of a belt 4" with recesses 41", which are arranged at regular intervals. The recesses 41" can be brought into engagement with teeth of a sprocket wheel so that the belt 4" when travelling over the sprocket wheel, and arranged between the sprocket wheel and the conveyor chain, can move along with the conveyor chain.

Figure 8:
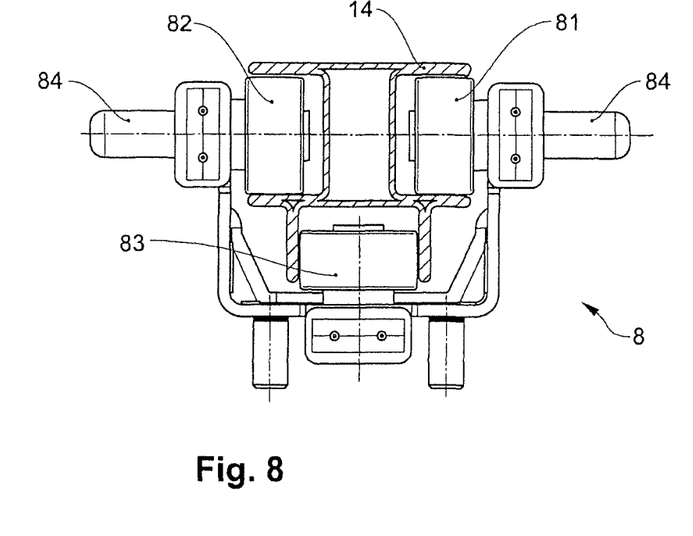
FIG. 8 shows a front view of an embodiment of a transport unit.

FIG. 8 shows a frontal view of an embodiment of a transport unit, which is configured as a trolley 8. The trolley 8 comprises rollers 81, 82, 83, by means of which the trolley 8 can be conveyed in a guide rail 14. The guide rail 14 is shown in a cut view. The trolley 8 further comprises pins 84, which are arranged laterally of the trolley 8 and in which catches of the conveyor chain can engage for driving the trolley 8.

It is claimed:

1. A conveyor device (100) for transporting a plurality of transport units (8), the conveyor device (100) comprising:
   a conveyor track (11, 12, 13, 14) conveying the plurality of transport units (8);
   at least two first guide rollers (2', 2.1-2.7);
   a conveyor chain (3, 3') which travels over the at least two first guide rollers (2', 2.1-2.7) and includes catches (31), via which the conveyor chain (3, 3') can be brought into releasable engagement with the transport units (8) for driving the transport units (8);
   a belt (4, 4', 4", 4.1-4.5) moving along with the conveyor chain (3, 3') via the at least two first guide rollers (2', 2.1-2.7), wherein the belt (4, 4', 4", 4.1-4.5) in the respective area of first guide rollers (2', 2.1-2.7) is arranged, respectively, between the first guide roller (2', 2.1-2.7) and the conveyor chain (3, 3') such that the conveyor chain (3, 3') lies against the belt (4, 4', 4", 4.1-4.5).

2. The conveyor device (100) according to claim 1, wherein the belt (4, 4', 4", 4.1-4.5) is configured such that the conveyor chain (3, 3') travels over the first guide rollers (2', 2.1-2.7) at a distance from the first guide rollers (2', 2.1-2.7).

3. The conveyor device (100) according to claim 1, wherein the conveyor chain (3, 3') is configured to travel over the at least two first guide rollers (2', 2.1-2.7) at a conveying speed and the belt (4, 4', 4", 4.1-4.5) is configured to move along with the conveyor chain (3, 3') at a speed which is less than or equal to the conveying speed of the conveyor chain (3, 3').

4. The conveyor device (100) according to claim 1, wherein the conveyor chain (3, 3') comprises chain links (32, 32'), which are in frictional contact with the belt (4, 4', 4", 4.1-4.5).

5. The conveyor device (100) according to claim 1, wherein the conveyor chain (3, 3') is configured as a roller chain and is in contact with the belt (4, 4', 4", 4.1-4.5) with rollers (33, 33').

6. The conveyor device (100) according to claim 1, wherein the belt (4, 4', 4", 4.1-4.5) is dimensioned such that the conveyor chain (3, 3'), in the area of the first guide rollers (2', 2.1-2.7), is in contact with the belt (4, 4', 4", 4.1-4.5), extending beyond the belt (4, 4', 4", 4.1-4.5) transversely to the conveying direction.

7. The conveyor device (100) according to claim 1, wherein the first guide rollers (2', 2.1-2.7) each comprise at least one groove (21, 21'), in which the belt (4, 4', 4", 4.1-4.5) can be, at least partially, received.

8. The conveyor device (100) according to claim 1, wherein the belt (4, 4', 4", 4.1-4.5) comprises one of the following cross-section profiles: trapezoidal-shaped, trapezoidal-shaped with at least one curved side, circular-shaped, oval, dumbbell-shaped, square, rectangular with at least one curved side.

9. The conveyor device (100) according to claim 1, wherein the belt (4") comprises recesses (41").

10. The conveyor device (100) according to claim 1, wherein the belt (4.2) comprises a shell (4.22) and a core (4.21), which are made of different materials.

11. The conveyor device (100) according to claim 1, wherein the conveyor device (100) comprises at least one second guide roller (6, 6.1, 6.2), over which the conveyor chain (3, 3') travels and which is arranged so as to rotate in the opposite direction to the first guide roller (2', 2.1-2.7).

12. The conveyor device (100) according to claim 1, wherein the conveyor device (100) comprises a sprocket wheel (5) for driving the conveyor chain (3, 3'), wherein the belt (4, 4', 4", 4.1-4.5) is guided past the sprocket wheel (5) without making contact.

13. The conveyor device (100) according to claim 12, wherein the sprocket wheel (5) comprises a damping element which is received in a groove (52.1, 52.2) of the sprocket wheel (5) such that the conveyor chain (3, 3'), as it travels over the sprocket wheel (5), is in contact, at least partially, with the damping element.

14. The conveyor device (100) according to claim 1, wherein the conveyor device (100) comprises at least one track switch (1), wherein the conveyor chain (3, 3') can be brought into engagement with the plurality of transport units in a branching-off conveyor track (11, 12, 13, 14) of the track switch (1).

15. The conveyor device (100) according to claim 11, wherein the at least two first guide rollers (2', 2.1-2.7) and/or the at least one second guide roller (6, 6.1, 6.2) is/are made at least partially of plastic and/or the at least two first guide rollers (2', 2.1 - 2.7) and/or the at least one second guide roller (6, 6.1, 6.2) is/are configured without teeth.

16. The conveyor device (100) according to claim 1, wherein the conveyor device is configured as an overhead conveyor device (100).

17. The conveyor device (100) according to claim 1, wherein the conveyor track is configured as a guide rail and the transport units are configured as trolleys which can be conveyed on the guide rail.

18. The conveyor device (100) according to claim 1, wherein the belt (4") comprises recesses (41") at regular intervals.

19. The conveyor device (100) according to claim 12, wherein the conveyor chain (3, 3') is configured as a roller chain, and the sprocket wheel (5) comprises two damping elements (53.1, 53.2), which are each received in the groove (52.1, 52.2) of the sprocket wheel (5) such that the conveyor chain (3, 3') is in contact with the damping element (53.1, 53.2) via lugs (53.1, 53.2).

* * * * *